US012683863B2

(12) United States Patent
Yu

(10) Patent No.: US 12,683,863 B2
(45) Date of Patent: Jul. 14, 2026

(54) NETWORK ARCHITECTURE, NETWORK COMMUNICATION METHOD, ELECTRONIC DEVICE, AND STORAGE MEDIUM

(71) Applicant: ZTE CORPORATION, Shenzhen (CN)

(72) Inventor: Jinghai Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 69 days.

(21) Appl. No.: 18/693,379

(22) PCT Filed: Aug. 10, 2022

(86) PCT No.: PCT/CN2022/111549
§ 371 (c)(1),
(2) Date: Mar. 19, 2024

(87) PCT Pub. No.: WO2023/051049
PCT Pub. Date: Apr. 6, 2023

(65) Prior Publication Data
US 2024/0396802 A1    Nov. 28, 2024

(30) Foreign Application Priority Data
Sep. 30, 2021    (CN) .......................... 202111162900.2

(51) Int. Cl.
*G06F 15/177*          (2006.01)
*H04L 41/0894*         (2022.01)
(Continued)

(52) U.S. Cl.
CPC .......... *H04L 41/0894* (2022.05); *H04L 41/12* (2013.01); *H04L 43/087* (2013.01)

(58) Field of Classification Search
CPC .... H04L 41/0894; H04L 41/12; H04L 43/087
See application file for complete search history.

(56) References Cited

U.S. PATENT DOCUMENTS 7,742,413 B1 *  6/2010  Bugenhagen ........... H04L 47/32
                                                        370/428
2002/0167911 A1 *  11/2002  Hickey ................. H04L 67/564
                                                        370/252

FOREIGN PATENT DOCUMENTS

CN          112491493 A        3/2021
CN          113382442 A        9/2021
(Continued)

OTHER PUBLICATIONS

International Searching Authority. International Search Report and Written Opinion for PCT Application No. PCT/CN2022/111549 and English translation, mailed Oct. 10, 2022, pp. 1-10.
(Continued)

*Primary Examiner* — Joseph R Maniwang
(74) *Attorney, Agent, or Firm* — Vivacqua Crane, PLLC

(57) ABSTRACT

A network architecture, a network communication method, an electronic device, and a storage medium are disclosed. The network architecture may include a plurality of network elements, the plurality of network elements are divided into a plurality of areas, an inter-area jitter adjuster is arranged at an area border network element of the areas or between two adjacent areas, the inter-area jitter adjuster has an adjustment policy configured therein, and the inter-area jitter adjuster is configured for performing jitter adjustment on a service packet from the area according to the adjustment policy.

6 Claims, 9 Drawing Sheets

(51) Int. Cl.
   *H04L 41/12*     (2022.01)
   *H04L 43/087*    (2022.01)

(56)                    References Cited

FOREIGN PATENT DOCUMENTS

EP            1950922 A1    7/2008
WO        2018114015 A1    6/2018

OTHER PUBLICATIONS

Korean Ministry of Intellectual Property. First Office Action for KR Application No. 10-2024-7013406 and English translation, mailed Apr. 15, 2026, pp. 1-16.

* cited by examiner

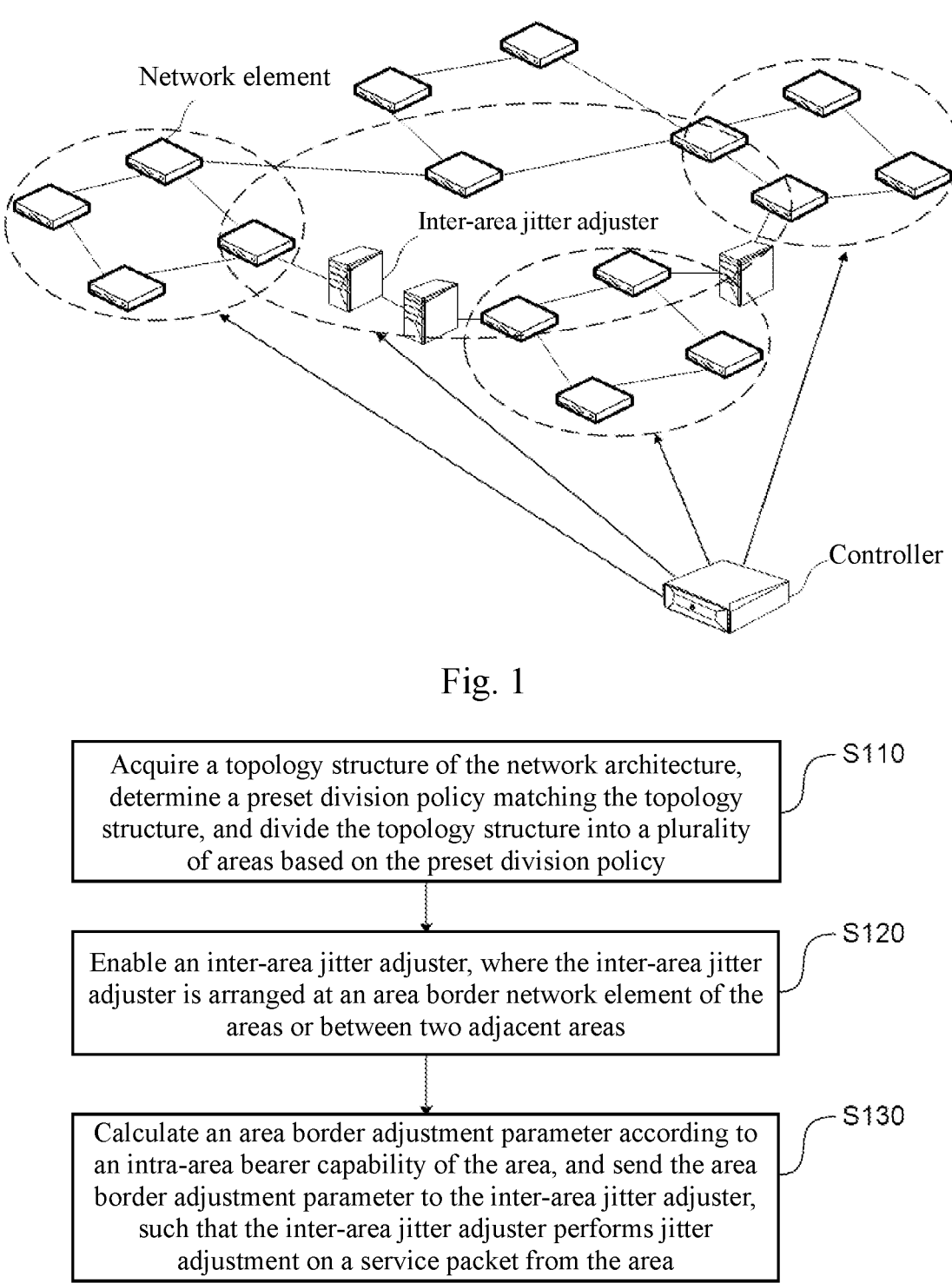

Fig. 1

Acquire a topology structure of the network architecture, determine a preset division policy matching the topology structure, and divide the topology structure into a plurality of areas based on the preset division policy ⌐ S110

Enable an inter-area jitter adjuster, where the inter-area jitter adjuster is arranged at an area border network element of the areas or between two adjacent areas ⌐ S120

Calculate an area border adjustment parameter according to an intra-area bearer capability of the area, and send the area border adjustment parameter to the inter-area jitter adjuster, such that the inter-area jitter adjuster performs jitter adjustment on a service packet from the area ⌐ S130

Fig. 2

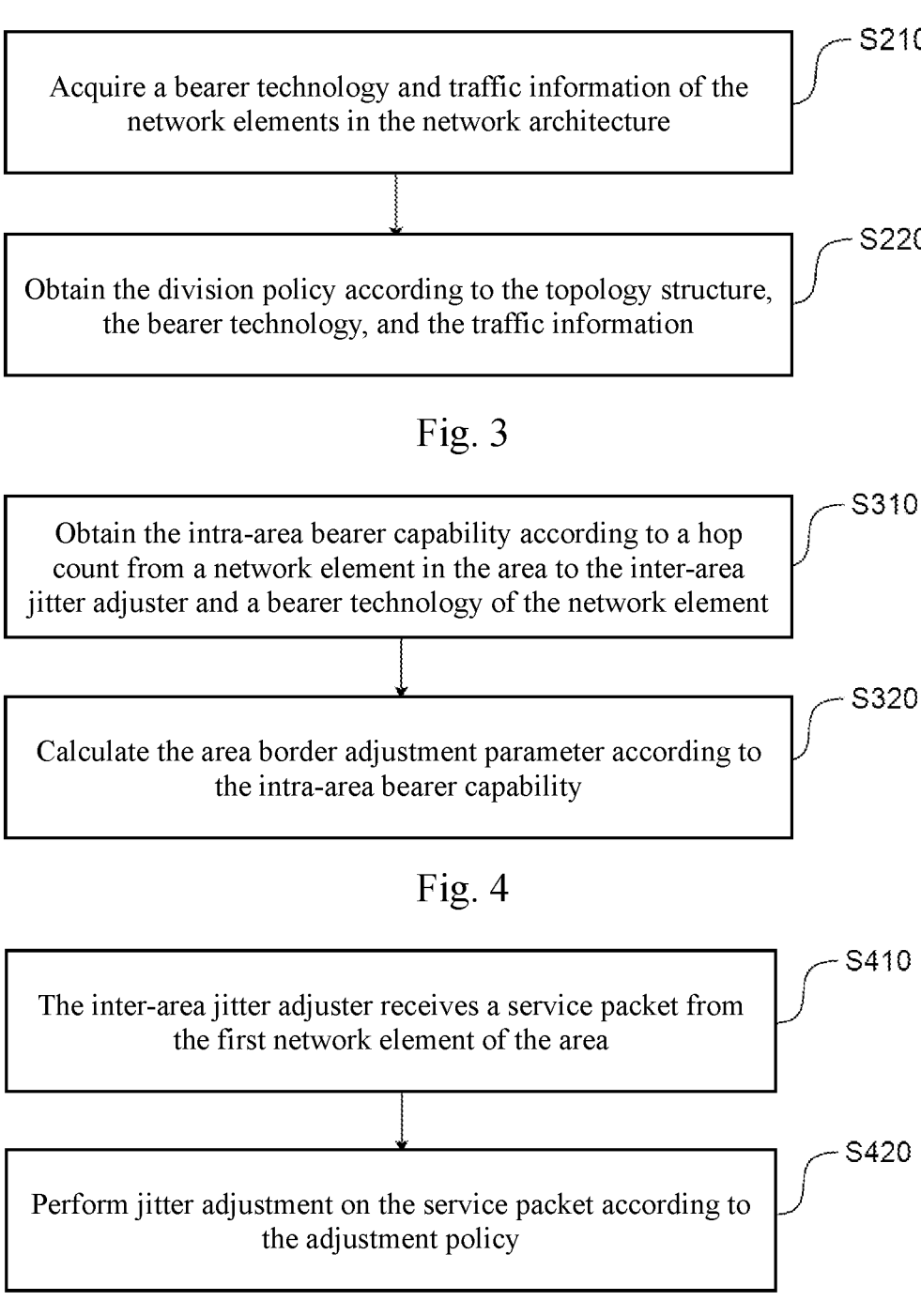

Acquire a bearer technology and traffic information of the network elements in the network architecture          S210

Obtain the division policy according to the topology structure, the bearer technology, and the traffic information          S220

Fig. 3

Obtain the intra-area bearer capability according to a hop count from a network element in the area to the inter-area jitter adjuster and a bearer technology of the network element          S310

Calculate the area border adjustment parameter according to the intra-area bearer capability          S320

Fig. 4

The inter-area jitter adjuster receives a service packet from the first network element of the area          S410

Perform jitter adjustment on the service packet according to the adjustment policy          S420

Fig. 5

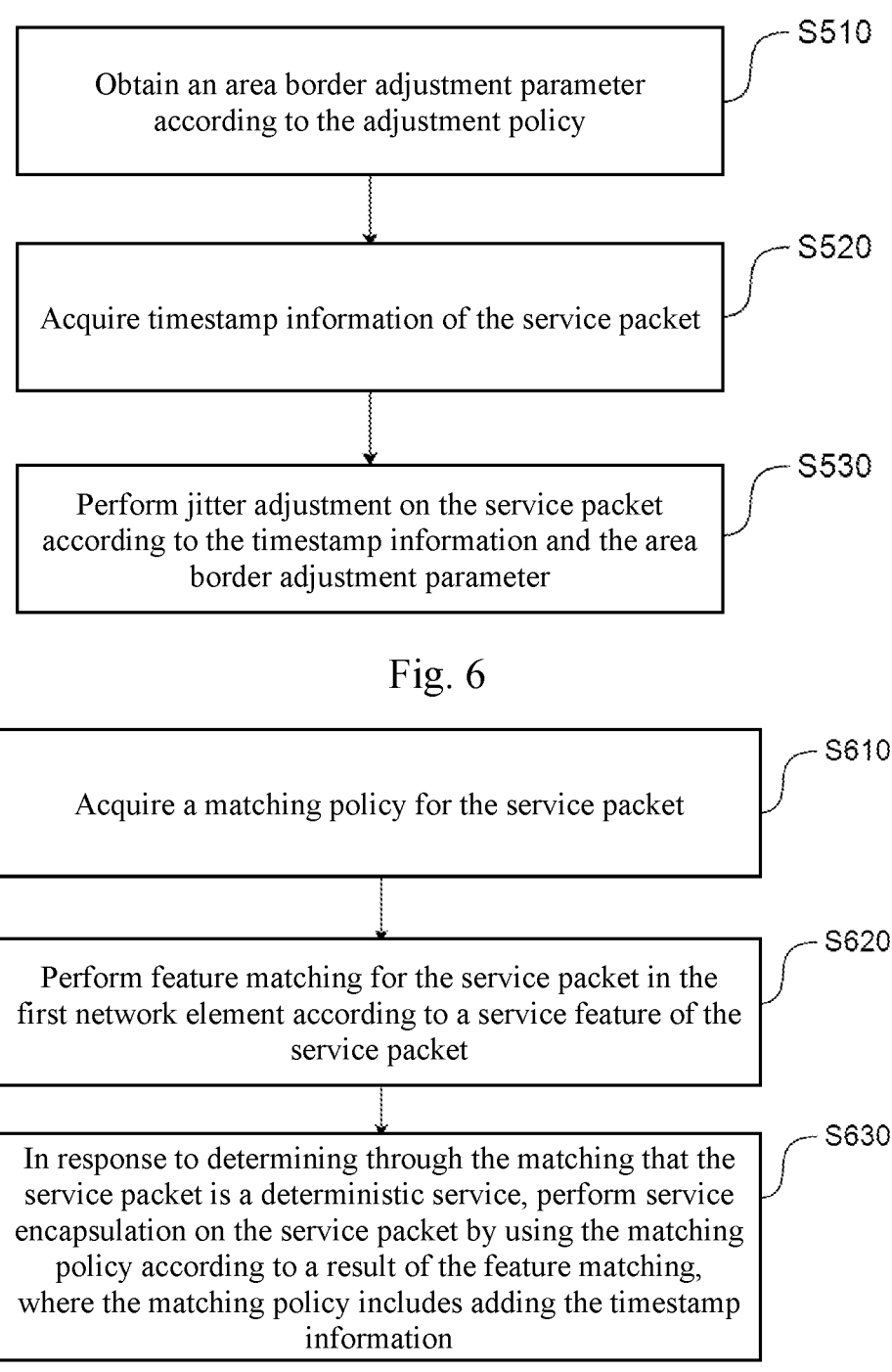

S510

Obtain an area border adjustment parameter according to the adjustment policy

S520

Acquire timestamp information of the service packet

S530

Perform jitter adjustment on the service packet according to the timestamp information and the area border adjustment parameter

Acquire a matching policy for the service packet

S620

Perform feature matching for the service packet in the first network element according to a service feature of the service packet

S630

In response to determining through the matching that the service packet is a deterministic service, perform service encapsulation on the service packet by using the matching policy according to a result of the feature matching, where the matching policy includes adding the timestamp information

Fig. 7

Packet format 2 re-encapsulated by node 1

Radar packet format 1

| 00:89:34:DA:AC:E3 |
| 00:89:34:DA:AC:01 |
| Ethernet type (89BB) |
| Timestamp T1 (four bytes) |
| Information data |

| Destination MAC address |
| Source MAC address |
| Ethernet type |
| Information data |

Packet format 2 re-encapsulated by router 1

Packet format 3 re-encapsulated by

NETWORK ARCHITECTURE, NETWORK COMMUNICATION METHOD, ELECTRONIC DEVICE, AND STORAGE MEDIUM

CROSS-REFERENCE TO RELATED APPLICATION

This application is a national stage filing under 35 U.S.C. § 371 of international application number PCT/CN2022/111549, filed Aug. 10, 2022, which claims priority to Chinese patent application No. 202111162900.2, filed Sep. 30, 2021. The contents of these applications are incorporated herein by reference in their entirety.

TECHNICAL FIELD

The present disclosure relates to the field of network communication technologies, and more particularly, to a network architecture, a network communication method, an electronic device, and a storage medium.

BACKGROUND

Among the existing network communication technologies, standards, and technologies such as Time Sensitive Networking (TSN), Deterministic Network (Detnet), and Deterministic IP Network (DIP) have been introduced. Despite their advancements, these network technologies sometimes encounter issues, such as requiring time synchronization, being unable to ensure delay jitter and inter-area jitter compression, and lack of flexibility, leading to high delay and large jitter in the process of data transmission of packets and other services, resulting in low network communication efficiency.

SUMMARY

The following is a summary of the subject matter set forth in this description. This summary is not intended to limit the scope of protection of the claims.

Embodiments of the present disclosure provide a network architecture, a network communication method, an electronic device, and a storage medium.

In accordance with a first aspect of the present disclosure, an embodiment provides a network architecture, including a plurality of network elements, where the plurality of network elements are divided into a plurality of areas, an inter-area jitter adjuster is arranged at an area border network element of the areas or between two adjacent areas, the inter-area jitter adjuster has an adjustment policy configured therein, and the inter-area jitter adjuster is configured for performing jitter adjustment on a service packet from the area according to the adjustment policy.

In accordance with a second aspect of the present disclosure, an embodiment provides a network communication method, applied to a control plane of a network architecture. The network communication method includes: acquiring a topology structure of the network architecture, determining a preset division policy matching the topology structure, and dividing the topology structure into a plurality of areas based on the preset division policy; enabling an inter-area jitter adjuster, where the inter-area jitter adjuster is arranged at an area border network element of the areas or between two adjacent areas; and calculating an area border adjustment parameter according to an intra-area bearer capability of the area, and sending the area border adjustment parameter to the inter-area jitter adjuster, such that the inter-area jitter adjuster performs jitter adjustment on a service packet from the area.

In accordance with a third aspect of the present disclosure, an embodiment provides a network communication method, applied to the network architecture of the embodiment of the first aspect of the present disclosure. The network communication method including: receiving, by the inter-area jitter adjuster, a service packet from a first network element of the area; and performing jitter adjustment on the service packet according to the adjustment policy.

In accordance with a fourth aspect of the present disclosure, an embodiment further provides an electronic device, including a memory and a processor, where the memory is configured for storing a computer program which, when executed by the processor, causes the processor to carry out the network communication method of the embodiment of the second aspect of the present disclosure or the network communication method of the embodiment of the third aspect of the present disclosure.

In accordance with a fifth aspect of the present disclosure, an embodiment further provides a computer-readable storage medium, storing a program which, when executed by a processor, causes the processor to carry out the network communication method of the embodiment of the second aspect of the present disclosure or the network communication method of the embodiment of the third aspect of the present disclosure.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and are not intended to limit the technical schemes of the present disclosure.

FIG. 1 is a schematic diagram of a network architecture according to an embodiment of the present disclosure;

FIG. 2 is a schematic flowchart of a network communication method according to an embodiment of the present disclosure;

FIG. 3 is a schematic flowchart of a network communication method according to another embodiment of the present disclosure;

FIG. 4 is a schematic flowchart of a network communication method according to another embodiment of the present disclosure;

FIG. 5 is a schematic flowchart of a network communication method according to another embodiment of the present disclosure;

FIG. 6 is a schematic flowchart of a network communication method according to another embodiment of the present disclosure;

FIG. 7 is a schematic flowchart of a network communication method according to another embodiment of the present disclosure;

DETAILED DESCRIPTION

Figure 8:
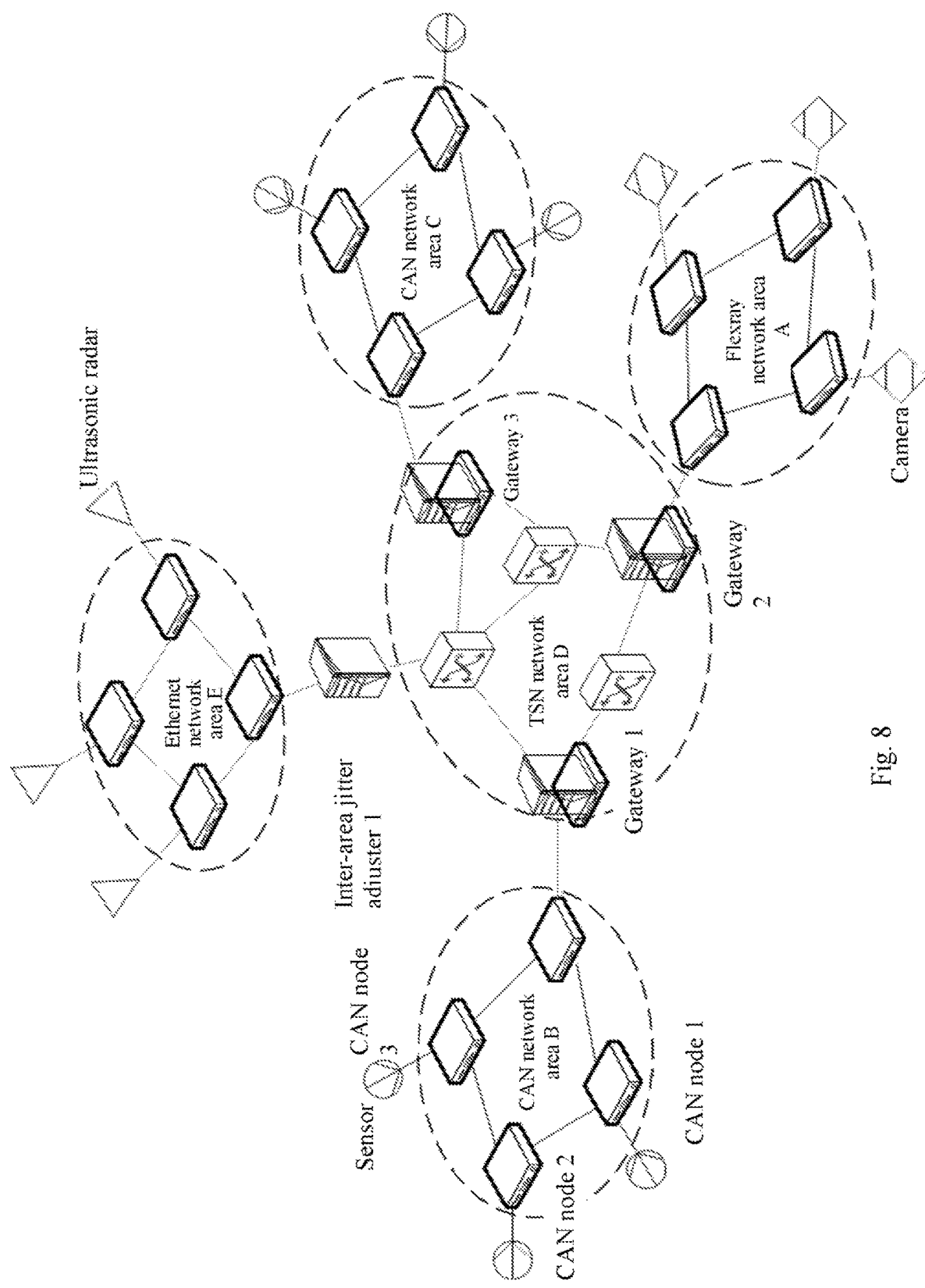
FIG. 8 is a schematic diagram of a network architecture of an in-vehicle network according to an embodiment of the present disclosure.

To make the objects, technical schemes, and advantages of the present disclosure clear, the present disclosure is described in further detail in conjunction with accompanying drawings and examples. It should be understood that the embodiments described herein are merely used for illustrating the present disclosure, and are not intended to limit the present disclosure.

It should be understood that in the description of the embodiments of the present disclosure, the term "at least one" means one or more, the term "plurality of" (or multiple) means at least two, the term such as "greater than", "less than", "exceed" or variants thereof prior to a number or series of numbers is understood to not include the number adjacent to the term. The term "at least" prior to a number or series of numbers is understood to include the number adjacent to the term "at least", and all subsequent numbers or integers that could logically be included, as clear from context. If used herein, the terms such as "first", "second", and the like are merely used for distinguishing technical features, and are not intended to indicate or imply relative importance, or implicitly point out the number of the indicated technical features, or implicitly point out the precedence order of the indicated technical features.

Currently, the industry has put forward standards and technologies such as TSN, Detnet, and DIP for low delay and low jitter services, as well as some related improved technical schemes. However, such schemes have their own problems. For example, TSN requires time synchronization, Detnet has no underlying forwarding mechanism to ensure delay jitter, and DIP lacks flexibility in multi-area combination and inter-area jitter compression, lacks flexibility, and does not have a basic guarantee for a specific delay range. These are problems on the forwarding plane. On the control plane, end-to-end deployment has problems such as long deployment time and deployment failure with deterministic requirements taken into consideration.

In view of the above, referring to FIG. 1, an embodiment of the present disclosure provides a network architecture. The network architecture is divided into a plurality of areas according to a plurality of network elements. An inter-area jitter adjuster is arranged at an area border network element of the areas or between adjacent areas. Jitter adjustment may be performed on a service packet from the area by using an area border adjustment parameter delivered by the control plane as an adjustment policy, such that the packet can be sent to another area after the jitter adjustment, thereby realizing low-delay and low-jitter network communication and improving the network communication efficiency.

The network architecture provided in the embodiment of the present disclosure includes a plurality of network elements which are divided into a plurality of areas. The network elements may be edge nodes in the network architecture, and may also be referred to as nodes. At least one network element is arranged in each of the areas. A network element at a border of an area is referred to as an area border network element. An inter-area jitter adjuster is arranged at an area border network element of the areas or between two adjacent areas. The inter-area jitter adjuster has an adjustment policy configured therein. The inter-area jitter adjuster is configured for performing jitter adjustment on the service packet from the area according to the adjustment policy. The adjustment policy may be delivered by the control plane in the network architecture and executed by the inter-area jitter adjuster. The service packet may be from any one of the plurality of areas and is to be sent to a network element in another area, thereby realizing inter-area communication. Because the inter-area jitter adjuster is arranged at the area border network element of the areas or in a path between two areas, inter-area jitter adjustment is realized to effectively eliminate the jitter problem between different network elements or areas. The inter-area jitter adjuster executes different adjustment policies according to different service packets, to reduce the inter-area delay. The inter-area jitter adjustment may be implemented by a single device unit or by area border devices of two areas, which is not particularly limited in the embodiments of the present disclosure.

It is to be noted that the network architecture in the embodiment of the present disclosure also includes the control plane, and at least one controller is arranged on the control plane. The controller may be connected to the inter-area jitter adjuster and the network elements. The controller can divide the network elements in the network architecture into areas according to information sent from the network, and can further obtain an adjustment policy according to an intra-area bearer capability in the area, including calculating the area border adjustment parameter, and delivers same to the corresponding inter-area jitter adjuster. The inter-area jitter adjuster performs jitter adjustment on the service packet according to the adjustment policy. The controller may be centralized or distributed controller logic, thereby forming the control plane.

In an embodiment, the area border adjustment parameter may be calculated according to a hop count from a network element to the inter-area jitter adjuster and an underlying bearer technology of the network element. The area border adjustment parameter may be a period size or delay parameter of the network element. The area border adjustment parameter may be selected according to different service packets. For example, different service packets have different periodicities, and the control plane can obtain the area border adjustment parameter by detecting the period size of the service packet. The delay parameter may be a value obtained through measurement, e.g., a median value, or may be a value selected from a range determined through periodicity mapping based on the hop count. Service packets sent by network elements at different positions in the area have different delay parameters. In addition, the inter-area jitter adjuster performs jitter adjustment on the service packet according to time information of the service packet and the area border adjustment parameter. The time information includes a time at which the service packet is sent. In an embodiment, the inter-area jitter adjuster compares a local time of the inter-area jitter adjuster with the time of sending the service packet and the period size or delay parameter of the service packet, to control whether to send the service packet out to another area. When a preset condition is not satisfied, the service packet is cached. When the preset condition is satisfied, the service packet is sent out to another area.

It is to be noted that, for the division in the embodiments of the present disclosure, the control plane delivers a division policy to the network elements in the network architecture, such that the network elements are divided into network areas according to the division policy. The division policy is obtained by the control plane according to an obtained topology structure of the network architecture. The division policy may also be obtained by the control plane according to the obtained topology structure of the network architecture and the bearer technology and traffic information of the network element. The traffic information is network traffic. The network architecture is divided into areas according to different bearer technologies and the topology structure of the network elements, and it is determined according to different traffic information whether the network element is to be used as a node in network communication. Jitter adjustment is not performed for network elements with low network traffic. The bearer technologies include Flexray bus, Controller Area Network (CAN), Local Interconnected Network (LIN), Media Oriented System Transport (MOST), TSN, periodicity mapping, Flexible Ethernet (FlexE) technology, fine-grained bearer, flow convergence characteristics, etc., which is not particularly limited in the embodiments of the present disclosure. The topology structure of the network architecture and the traffic information of the network elements may be dynamically collected and acquired by the control plane, and may also be statically configured or obtained based on planning information or historical information. The traffic information includes: some statistical information of a service flow, e.g., flow characteristics, bandwidth, etc.; and statistical information of nodes that the service flow passes through, e.g., the number of flow entries passing through nodes, bandwidth, overall proportion, etc.

In an embodiment, the areas include a first area and a second area, the network elements include a first network element located in the first area and a second network element located in the second area, and the inter-area jitter adjuster is arranged between the first area and the second area and is configured to perform jitter adjustment on a service packet from the first network element in the first area according to the adjustment policy, such that the service packet is sent to the second network element in the second area. The inter-area jitter adjuster may be arranged on a link between the first area and the second area, or may be implemented using devices in area border network elements of the first area and the second area that are connected. In the embodiments of the present disclosure, through the intelligent division of the network architecture into areas, multi-level adjustment between the areas and end-to-end deployment can be implemented. At least one inter-area jitter adjuster may be arranged on the link between the first area and the second area. The number of inter-area jitter adjusters may be set according to actual jitter control requirements, delay requirements, etc. In this way, when a service packet is sent from the first area to the second area, jitter adjustment can be performed on the service packet for one or more times. Other areas may further be included between the first area and the second area. As areas through which the service packet passes, these areas forward the service packet after receiving the service packet, such that the service packet can be sent by the first network element in the first area to the second network element in the second area which is a destination area. The first network element and the second network element may be any network element in the areas, which is not particularly limited in the embodiments of the present disclosure.

In an embodiment, the areas further include a central area located between the first area and the second area, and an inter-area channel is arranged in the central area according to communication characteristics, such that the service packet having been subjected to jitter adjustment is sent from the first network element to the second network element through the inter-area channel. In the embodiments of the present disclosure, a plurality of inter-area channels are established in advance in the central area between the first area and the second area. A plurality of areas may be included between the first area and the second area. A core area is selected from the areas as the central area for communication with the first area and the second area connected. The established inter-area channels are tunnels based on the bearer technology corresponding to the service packet. The communication characteristic includes a plurality of different bandwidths, expected delays, and expected jitters, etc. Different bandwidths can provide different transmission efficiency. With the inter-area channels established in advance in the network architecture, the service packet sent by the first network element can be selected to be mounted in the matching inter-area channel, so as to reach the second network element which is the destination. This realizes quick and efficient end-to-end deployment, and is suitable for complex application scenarios.

It is to be noted that in the embodiments of the present disclosure, the inter-area channels established according to different communication characteristics can be used for transmission of service packets having different communication characteristic requests. For example, a plurality of inter-area channels may be established between the first network element and the second network element. Each inter-area channel has a different bandwidth, expected delay, and expected jitter, etc. The communication characteristic request of the service packet includes information such as a priority request, a jitter request, and a bandwidth request. According to the request information, different inter-area channels may be selected for mounting the service packet. It can be understood that, priority levels may be respectively set for the priority request, the jitter request, and the bandwidth request. For example, the inter-area channel to be selected needs to preferentially satisfy the priority request, the jitter request, or the delay request, and inter-area channels whose bandwidth cannot meet the requirements of the service packet should not be selected. The matching inter-area channel may be properly set according to an actual network communication requirement, or may be selected through artificial intelligence, which is not particularly limited in the embodiments of the present disclosure. It can be understood that, after the service packet is mounted in the matching inter-area channel, an inter-area jitter adjuster at an area border network element of the first area or between the first area and the second area further performs jitter adjustment on the service packet that is about to be sent out of the first area, an inter-area jitter adjuster at an area border network element of the second area may further perform jitter adjustment.

Based on the network architecture shown in FIG. 1, referring to FIG. 2, an embodiment of the present disclosure provides a network communication method, applied to a control plane of a network architecture. The structure of the network architecture has been described in the above embodiments, so the details will not be repeated here. The network communication method includes, but not limited to, the following steps S110 to S130.

At S110, a topology structure of the network architecture is acquired, a preset division policy matching the topology structure is determined, and the topology structure is divided into a plurality of areas based on the preset division policy.

In an embodiment, the control plane acquires the topology structure of the network architecture, determines a preset division policy matching the topology structure, and divides the topology structure into a plurality of areas based on the preset division policy. Division policies are pre-established policies matching different topology structures. The division policy matching the network architecture is obtained according to the topology structure. In an embodiment, after obtaining the matching division policy according to the topology structure of network elements in the network architecture, the control plane delivers the division policy to the network elements to establish at least one area.

At S120, an inter-area jitter adjuster is enabled, where the inter-area jitter adjuster is arranged at an area border network element of the areas or between two adjacent areas.

In an embodiment, after dividing the network architecture into areas, the control plane enables an inter-area jitter adjuster in the network architecture, where the inter-area jitter adjuster is arranged at an area border network element of the areas or between two adjacent areas. In the embodiments of the present disclosure, a plurality of different inter-area jitter adjusters may be enabled. By using different jitter adjustment technologies, the inter-area jitter adjusters can synchronously change a delay performance indicator.

At S130, an area border adjustment parameter is calculated according to an intra-area bearer capability of the area, and the area border adjustment parameter is sent to the inter-area jitter adjuster, such that the inter-area jitter adjuster performs jitter adjustment on a service packet from the area.

In an embodiment, the control plane calculates an area border adjustment parameter according to an intra-area bearer capability of the area according to the areas established in the network architecture, and sends the area border adjustment parameter to the inter-area jitter adjuster, such that the inter-area jitter adjuster performs jitter adjustment on a service packet from the area. The service packet may be from any one of the plurality of areas and is to be sent to a network element in another area, thereby realizing inter-area communication. Because the inter-area jitter adjuster is arranged at the area border network element of the area or in a path between two areas, inter-area jitter adjustment is realized to effectively eliminate the jitter problem between different network elements or areas. The inter-area jitter adjuster executes different adjustment policies according to different service packets, to reduce the inter-area delay.

Referring to FIG. 3, in an embodiment, the division policy is obtained by performing, for example, but not limited to, the following steps S210 and S220.

At S210, a bearer technology and traffic information of the network elements in the network architecture are acquired.

At S220, the division policy is obtained according to the topology structure, the bearer technology, and the traffic information.

In an embodiment, the division policy may be obtained by the control plane according to the obtained topology structure of the network architecture and the bearer technology and traffic information of the network element. The traffic information is network traffic. The network architecture is divided into areas according to different bearer technologies and the topology structure of the network elements, and it is determined according to different traffic information whether the network element is to be used as a node in network communication. Jitter adjustment is not performed for network elements with low network traffic. The bearer technologies include Flexray bus, CAN, LIN, MOST, TSN, periodicity mapping, FlexE, fine-grained bearer, flow convergence, etc., which is not particularly limited in the embodiments of the present disclosure. The topology structure of the network architecture and the traffic information of the network elements may be dynamically collected and acquired by the control plane, and may also be statically configured or obtained based on planning information or historical information. The traffic information includes: some statistical information of a service flow, e.g., flow characteristics, bandwidth, etc.; and statistical information of nodes that the service flow passes through, e.g., the number of flow entries passing through nodes, bandwidth, overall proportion, etc.

In an embodiment, after S130, the network communication method may further include, but not limited to, a following step:

selecting, according to division of the areas, a central area from the areas and arranging an inter-area channel in the central area according to a plurality of communication characteristics, such that the service packet having been subjected to jitter adjustment is sent from a first network element of a first area to a second network element of a second area through the inter-area channel.

In an embodiment, the areas include a first area and a second area, the network elements include a first network element located in the first area and a second network element located in the second area, and the inter-area jitter adjuster is arranged between the first area and the second area and is configured to perform jitter adjustment on a service packet from the first network element in the first area according to the area border adjustment parameter, such that the service packet is sent to the second network element in the second area. The inter-area jitter adjuster may be arranged on a link between the first area and the second area, or may be implemented using devices in area border network elements of the first area and the second area that are connected. In the embodiments of the present disclosure, through the intelligent division of the network architecture into areas, multi-level adjustment between the areas and end-to-end deployment can be implemented. At least one inter-area jitter adjuster may be arranged on the link between the first area and the second area. The number of inter-area jitter adjusters may be set according to actual jitter control requirements, delay requirements, etc. In this way, when a service packet is sent from the first area to the second area, jitter adjustment can be performed on the service packet for one or more times. Other areas may further be included between the first area and the second area. As areas through which the service packet passes, these areas forward the service packet after receiving the service packet, such that the service packet can be sent by the first network element in the first area to the second network element in the second area which is a destination area. The first network element and the second network element may be any network element in the areas, which is not particularly limited in the embodiments of the present disclosure.

In an embodiment, the areas further include a central area, the control plane selects, according to division of the areas, a central area from the areas and arranges an inter-area channel in the central area according to a plurality of communication characteristics, and the central area is located between the first area and the second area, such that the service packet having been subjected to jitter adjustment is sent from a first network element of a first area to a second network element of a second area through the inter-area channel. In the embodiments of the present disclosure, a plurality of inter-area channels are established in advance in the central area between the first area and the second area. A plurality of areas may be included between the first area and the second area. A core area is selected from the areas as the central area for communication with the first area and the second area connected. The established inter-area channels are tunnels based on the bearer technology corresponding to the service packet. The communication characteristic includes a plurality of different bandwidths, expected delays, and expected jitters, etc. Different bandwidths can provide different transmission efficiency. With the inter-area channels established in advance in the network architecture, the service packet sent by the first network element can be selected to be mounted in the matching inter-area channel, so as to reach the second network element which is the destination. This realizes quick and efficient end-to-end deployment, and is suitable for complex application scenarios.

It is to be noted that in the embodiments of the present disclosure, the inter-area channels established according to different communication characteristics can be used for transmission of service packets having different communication characteristic requests. For example, a plurality of inter-area channels may be established between the first network element and the second network element. Each inter-area channel has a different bandwidth, expected delay, and expected jitter, etc. The communication characteristic request of the service packet includes information such as a priority request, a jitter request, and a bandwidth request. According to the request information, different inter-area channels may be selected for mounting the service packet. It can be understood that, priority levels may be respectively set for the priority request, the jitter request, and the bandwidth request. For example, the inter-area channel to be selected needs to preferentially satisfy the priority request, the jitter request, or the delay request, and inter-area channels whose bandwidth cannot meet the requirements of the service packet should not be selected. The matching inter-area channel may be properly set according to an actual network communication requirement, or may be selected through artificial intelligence, which is not particularly limited in the embodiments of the present disclosure.

Referring to FIG. 4, in an embodiment, the S120 in the network communication method may further include, but not limited to, the following steps S310 and S320.

At S310, the intra-area bearer capability is obtained according to a hop count from a network element in the area to the inter-area jitter adjuster and a bearer technology of the network element.

At S320, the area border adjustment parameter is calculated according to the intra-area bearer capability.

In an embodiment, the control plane obtains the intra-area bearer capability according to the hop count from the network element in the area to the inter-area jitter adjuster and the bearer technology of the network element, and calculates the area border adjustment parameter according to the intra-area bearer capability. The area border adjustment parameter may be a period size or delay parameter of the network element. The area border adjustment parameter may be selected according to different service packets. For example, different service packets have different periodicities, and the control plane can obtain the area border adjustment parameter by detecting the period size of the service packet. The delay parameter is obtained according to the hop count from the network element to the inter-area jitter adjuster. Service packets sent by network elements at different positions in the area have different delay parameters. In addition, the inter-area jitter adjuster performs jitter adjustment on the service packet according to time information of the service packet and the area border adjustment parameter. The time information includes a time at which the service packet is sent. In an embodiment, the inter-area jitter adjuster compares a local time of the inter-area jitter adjuster with the time of sending the service packet and the period size or delay parameter of the service packet, to control whether to send the service packet out to another area. When a preset condition is not satisfied, the service packet is cached. When the preset condition is satisfied, the service packet is sent out to another area.

Based on the network architecture shown in FIG. 1, referring to FIG. 5, an embodiment of the present disclosure provides a network communication method, applied to a network architecture. The structure of the network architecture has been described in the above embodiments, so the details will not be repeated here. The network communication method includes, but not limited to, the following steps S410 to S420.

At S410, the inter-area jitter adjuster receives a service packet from the first network element of the area.

At S420, jitter adjustment is performed on the service packet according to the adjustment policy.

In an embodiment, the network communication method is applied to the forwarding plane in the network architecture. The forwarding plane includes the inter-area jitter adjuster described in the above embodiment. The inter-area jitter adjuster in the network architecture performs jitter adjustment on the service packet from the first network element in the first area according to the adjustment policy. The inter-area jitter adjuster may be arranged on a link between the first area and the destination area to which the service packet is sent, or may be implemented using an area border network element. Multi-level adjustment between the areas and end-to-end deployment can be implemented. At least one inter-area jitter adjuster may be arranged. The number of inter-area jitter adjusters may be set according to actual jitter control requirements, delay requirements, etc. In this way, when a service packet is sent from the first area to the destination area, jitter adjustment can be performed on the service packet for one or more times. Other areas may further be included between the first area and the destination area. As areas through which the service packet passes, these areas forward the service packet after receiving the service packet, such that the service packet can be sent by the first network element in the first area to a network element in the destination area.

Referring to FIG. 6, in an embodiment, the S420 in the network communication method may further include, but not limited to, the following steps S510 to S530.

At S510, an area border adjustment parameter is obtained according to the adjustment policy.

At S520, timestamp information of the service packet is acquired.

At S530, jitter adjustment is performed on the service packet according to the timestamp information and the area border adjustment parameter.

In an embodiment, the forwarding plane of the network structure obtains the area border adjustment parameter according to the adjustment policy delivered by the control plane. The area border adjustment parameter may be calculated according to the hop count from the network element to the inter-area jitter adjuster and the underlying bearer technology of the network element. The area border adjustment parameter may be a period size or delay parameter of the network element. The area border adjustment parameter may be selected according to different service packets. For example, different service packets have different periodicities, and the control plane may detect the period size of the service packet to obtain the area border adjustment parameter. The delay parameter is obtained according to the hop count from the network element to the inter-area jitter adjuster. Service packets sent by network elements at different positions in the area have different delay parameters. In addition, the inter-area jitter adjuster acquires the timestamp information of the service packet and the area border adjustment parameter and performs jitter adjustment on the service packet. The timestamp information is time information of the service packet, which includes a time point at which the service packet is sent. In an embodiment, the inter-area jitter adjuster compares a local time of the inter-area jitter adjuster with the timestamp information of sending the service packet and the period size or delay parameter of the service packet, to control whether to send the service packet out to another area. When a preset condition is not satisfied, the service packet is cached. When the preset condition is satisfied, the service packet is sent out to another area.

Referring to FIG. 7, in an embodiment, before S520, the network communication method may further include, but not limited to, the following steps S610 to S630.

At S610, a matching policy for the service packet is acquired.

At S620, feature matching for the service packet is performed in the first network element according to a service feature of the service packet.

At S630, when determining through the matching that the service packet is a deterministic service, service encapsulation is performed on the service packet by using the matching policy according to a result of the feature matching, where the matching policy includes adding the timestamp information.

In an embodiment, the forwarding plane of the network structure needs to perform feature matching for the service packet and perform service encapsulation. The forwarding plane acquires the matching policy for the service packet, and performs service feature matching when the service packet enters the first network element. In an embodiment, the forwarding plane performs feature matching for the service packet in the area border network element according to the service feature of the service packet, determines whether the service packet is a deterministic service according to the service feature, and performs follow-up operation process only when the service packet is a deterministic service. After determining that the service packet is a deterministic service, the forwarding plane encapsulates the service according to the matching policy to carry related timestamp information, or modifies related information, including: a flow identification and time information, e.g., absolute time information or relative time information, periodicity information, etc. After the service encapsulation, the service packet is transmitted in one network element in the network architecture, and other network elements forward the service packet according to a normal processing procedure. Feature matching is performed to determine a network element through which the service packet enters the local area.

It is to be noted that in the network element, a corresponding service packet identification policy and re-encapsulation mode need to be configured, or all packets need to be re-encapsulated by default, which is not particularly limited in the embodiments of the present disclosure.

In an embodiment, before S410, the network communication method may further include, but not limited to, a following step:

determining, in the first network element according to a communication characteristic request of the service packet, an inter-area channel where the corresponding communication characteristic in the central area is located, such that the service packet is sent from the first network element of the first area to the second network element of the second area through the inter-area channel.

In an embodiment, the areas further include a central area located between the first area and the second area, and the forwarding plane arranges an inter-area channel in the central area according to communication characteristics, such that the service packet having been subjected to jitter adjustment is sent from the first network element to the second network element through the inter-area channel. In the embodiments of the present disclosure, in the forwarding plane, a plurality of inter-area channels are established in advance in the central area between the first area and the second area. A plurality of areas may be included between the first area and the second area. A core area is selected from the areas as the central area for communication with the first area and the second area connected. The established inter-area channels are tunnels based on the bearer technology corresponding to the service packet. The communication characteristic includes a plurality of different bandwidths, expected delays, and expected jitters, etc. Different bandwidths can provide different transmission efficiency. With the inter-area channels established in advance in the network architecture, the service packet sent by the first network element can be selected to be mounted in the matching inter-area channel, so as to reach the second network element which is the destination. This realizes quick and efficient end-to-end deployment, and is suitable for complex application scenarios.

In an embodiment, the inter-area channels established according to different communication characteristics can be used for transmission of service packets having different communication characteristic requests. For example, a plurality of inter-area channels may be established between the first network element and the second network element. Each inter-area channel has a different bandwidth, expected delay, and expected jitter, etc. The communication characteristic request of the service packet includes information such as a priority request, a jitter request, and a bandwidth request. According to the request information, different inter-area channels may be selected for mounting the service packet. It can be understood that, priority levels may be respectively set for the priority request, the jitter request, and the bandwidth request. For example, the inter-area channel to be selected needs to preferentially satisfy the priority request, the jitter request, or the delay request, and inter-area channels whose bandwidth cannot meet the requirements of the service packet should not be selected. The matching inter-area channel may be properly set according to an actual network communication requirement, which is not particularly limited in the embodiments of the present disclosure. It can be understood that, after the service packet is mounted in the matching inter-area channel, an inter-area jitter adjuster at an area border network element of the first area or between the first area and the second area further performs jitter adjustment on the service packet that is about to be sent out of the first area, an inter-area jitter adjuster at an area border network element of the second area may further perform jitter adjustment.

It is to be noted that when a service packet comes out from one area and enters another area, the network communica- (2) The controller enables a jitter adjustment function on several inter-area devices, i.e., enables inter-area jitter adjusters, namely, inter-area jitter adjusters 1 at gateways 1, 2, and 3 and between the areas D and E. The inter-area jitter adjuster 1 may be an independent device unit or may be implemented using area border devices of two areas.

(3) The controller delivers an adjustment policy to the inter-area jitter adjuster.

In the embodiments of the present disclosure, an inter-area jitter adjuster may be arranged in the gateway. For the inter-area jitter adjuster at the gateway 1, an adjustment policy is delivered to perform jitter adjustment on a packet from a CAN node 1 according to a period. The node in the embodiments of the present disclosure is the network element described in the above embodiments.

The inter-area jitter adjuster at the gateway 1 forms a policy entry as follows.

TABLE 1

| | Jitter adjustment policy of inter-area jitter adjuster at gateway 1 | | | | | | |
|---|---|---|---|---|---|---|---|
| Packet matching | Periodicity source | Period size | Area ID | pro-D | Ingress node | Egress node | Bearer technology |
| CAN packet ID = 1 | 0 (preset) | 125 μs | B | NA | CAN node 1 | Gateway 1 | 1 (CAN) | tion method in the embodiments of the present disclosure can be repeated to ensure that the jitter of each area is independently controlled.

Specific embodiments are provided below according to specific application scenarios.

pro-D is the delay parameter described in the above embodiments. For the inter-area jitter adjuster at the gateway 2, the controller delivers an adjustment policy to perform jitter adjustment on a packet having a FlexRay frame ID of 1 according to a period, and automatically detects the periodicity.

The inter-area jitter adjuster at the gateway 2 forms a policy entry as follows.

TABLE 2

| | Jitter adjustment policy of inter-area jitter adjuster at gateway 2 | | | | | | |
|---|---|---|---|---|---|---|---|
| Packet matching | Periodicity source | Period size | Area ID | pro-D | Ingress node | Egress node | Bearer technology |
| Frame ID = 1 | 1 (automatic detection) | 250 μs | A | NA | NA | Gateway 2 | 2 (FlexRay) |

Referring to FIG. 8, in Embodiment One, the method is applied in an in-vehicle network.

On the control plane of the network architecture, the following processes are performed.

(1) A controller divides the network into five network areas according to a network topology of the network and an underlying bearer technology of each area. A network area A uses a Flexray bus as a bearer for mounting of various cameras. A network area B and a network area C use a CAN bus as a bearer for mounting of various sensors. A network area D uses a TSN as a bearer, which is used for backbone communication and allows for the arrangement of some gateway devices to support interworking of various protocols. A network area E uses an Ethernet as a bearer for mounting of various detection radars.

The inter-area jitter adjuster at the gateway 3 does not need to perform jitter adjustment and therefore does not form an adjustment policy table.

Three adjustment policies are delivered for the inter-area jitter adjuster 1 between the area D and the area E to perform jitter adjustment for Media Access Control (MAC) addresses of nodes 1, 2, and 3 of the Ethernet. For example, preset delay parameters pro-D from the nodes 1, 2, and 3 to the inter-area jitter adjuster 1 are respectively 50 μs, 80 μs, and 60 μs, and the MAC addresses of the nodes 1, 2, and 3 are respectively set to 00:89:34:DA:AC:01, 00:89:34:DA:AC:02, and 00:89:34:DA:AC:03. The inter-area jitter adjuster 1 (with a MAC address of 00:89:34:DA:AC:E3) forms the following policy entries.

TABLE 3

| | Jitter adjustment policy of inter-area jitter adjuster 1 | | | | | | |
|---|---|---|---|---|---|---|---|
| Packet matching | Periodicity source | Period size | Area ID | pro-D | Ingress node | Egress node | Bearer technology |
| Source MAC = 00:89:34:DA:AC:01 | NA | NA | E | 50 μs | NA | 00:89:34:DA:AC:E3 | 3 (Ethernet) |
| Source MAC = 00:89:34:DA:AC:02 | NA | NA | E | 80 μs | 00:89:34:DA:AC:02 | 00:89:34:DA:AC:E3 | 3 (Ethernet) |
| Source MAC = 00:89:34:DA:AC:03 | NA | NA | E | 60 μs | NA | 00:89:34:DA:AC:E3 | 3 (Ethernet) |

(4) Because the network topology is small and the traffic is not complex, there is no need to establish an inter-area channel pro-Tunnel.

On the forwarding plane of the network architecture, the following processes are performed.

(1) For service packets from areas A/B/C, no extra encapsulation processing needs to be performed, and the controller does not deliver a special matching policy, so that matching processing does not need to be performed. For the area E, the nodes 1, 2, and 3 perform matching on a packet entering the area E according to a matching policy.

Figure 9:
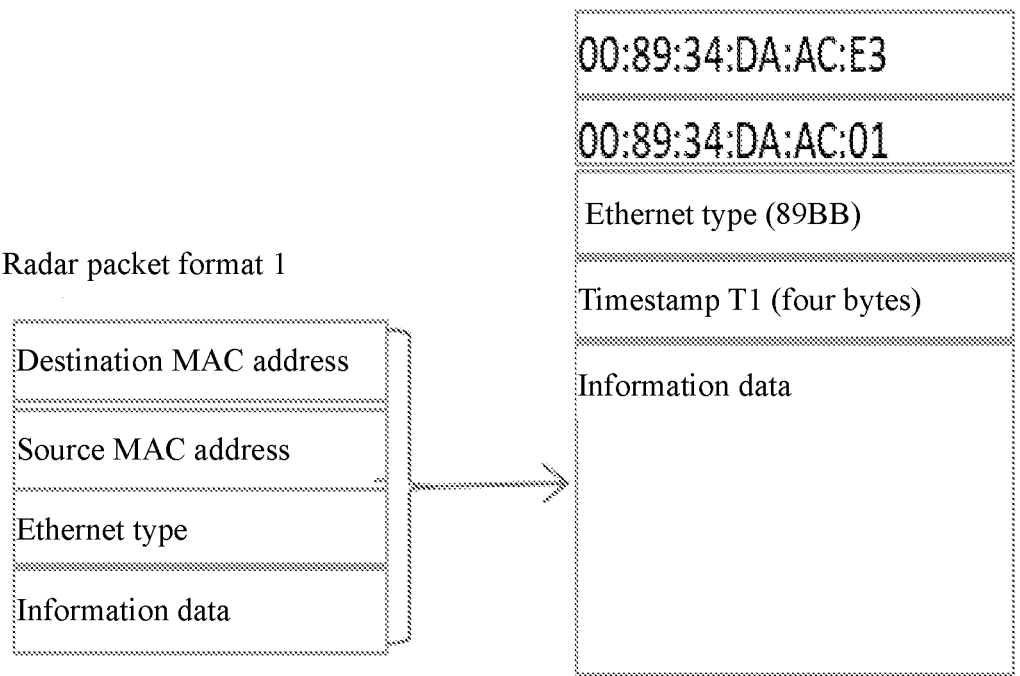
FIG. 9 is a schematic diagram of a re-encapsulation packet format according to an embodiment of the present disclosure.

(2) For the area E, the nodes 1, 2, and 3 perform matching according to a matching policy, re-encapsulate the matching service packet, and add time related information, a MAC address of the node, etc. As shown in FIG. 9, a radar packet is re-encapsulated at the node 1, and timestamp information is added. It is to be noted that the format here is only an example, and an Ethernet type value (0x89BB) and the number of bytes occupied by a timestamp T1 (4 bytes) may be changed.

(3) The inter-area jitter adjuster 1 performs jitter adjustment on the service packet according to Table 3. The steps are as follows.

(A) The timestamp T1 in the matching service packet is extracted.

(B) A local time T2 is checked.

(C) According to Table 3, pro-D=50 μs.

(D) When $T2<T1+50$ μs, the packet is cached until $T2>=T1+50$ μs, at which moment the service packet is sent. When $T2>=T1+50$ μs, the service packet is sent directly.

(E) The header of the re-encapsulated packet may be removed or modified as required, which is not particularly limited in the embodiments of the present disclosure.

The jitter adjusters at the gateways 1 and 2 perform jitter adjustment according to the periodicity characteristic and the period size. The jitter adjuster at the gateway 1 performs the adjustment step as follows.

(A) After receiving the service packet, the jitter adjuster determines through matching that a CAN ID of the packet is 1.

(B) The jitter adjuster extracts the period size from Table 1.

(C) The jitter adjuster determines whether the service packet is the first packet; if yes, sends the service packet directly, and records a sending time point Tpro_send; if not, extracts a local time point Tnow. When $Tnow-Tpro\_send>=125$ μs, the jitter adjuster sends the service packet; otherwise, the jitter adjuster does not send the service packet until $Tpro\_send>=125$ μs. When sending the service packet, the jitter adjuster resets $Tpro\_send=Tnow$. The operation of the jitter adjuster at the gateway 2 is similar to the above steps, so the details will not be repeated here.

(4) The subsequent forwarding process is executed according to a normal procedure.

Figure 10:
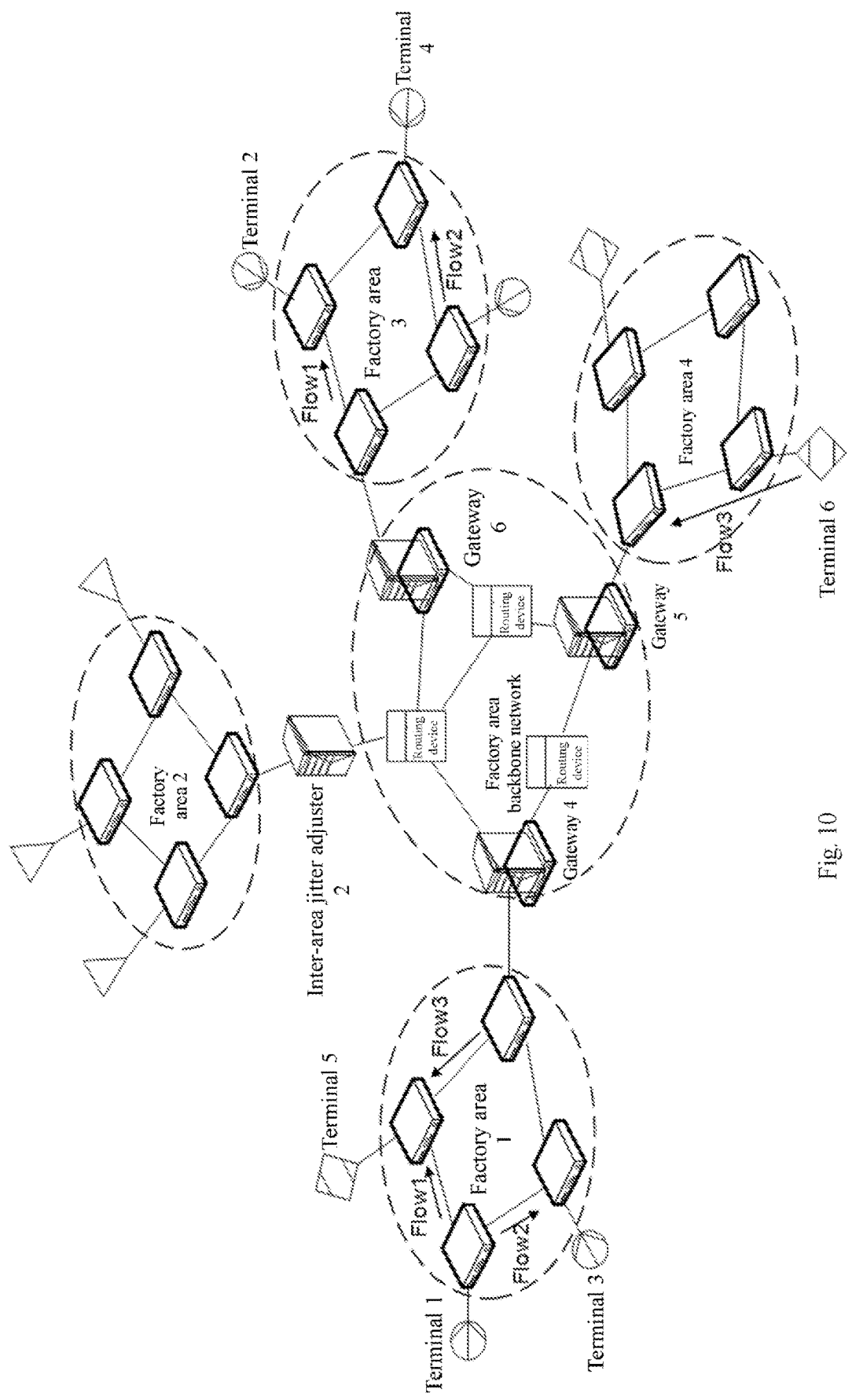
FIG. 10 is a schematic diagram of a network architecture of networking of a plurality of factory areas according to an embodiment of the present disclosure.

Referring to FIG. 10, in Embodiment Two, the method is applied in a multi-factory area networking.

On the control plane of the network architecture, the following processes are performed.

(1) The controller divides the network into five network areas according to the network topology and network traffic (where nodes through which more than 50% of the traffic passes are edge nodes), namely, a factory area 1 (LAN_D1), a factory area 2 (LAN_D2), a factory area 3 (LAN_D3), a factory area 4 (LAN_D4), and a backbone network area (MAN_D1) connecting the factory areas.

(2) The controller enables a jitter adjustment function on several inter-area devices, i.e., enables inter-area jitter adjusters, namely, inter-area jitter adjusters 2 at gateways 4, 5, and 6 and between the factory area 2 and the backbone network area. The inter-area jitter adjuster 2 may be an independent device unit or may be implemented using area border devices of two areas.

(3) The controller delivers an adjustment policy to the inter-area jitter adjuster.

In the embodiments of the present disclosure, an inter-area jitter adjuster may be arranged in the gateway. For the inter-area jitter adjuster at the gateway 4, the controller delivers an adjustment policy to perform jitter adjustment on packets of Flow 1 and Flow 2 sent from a network edge node 1.1 of the factory area 1 according to a preset delay parameter pro-D of 50 μs. For example, a MAC address of the network edge node 1.1 is 00:89:34:DA:BC:01. The inter-area jitter adjuster at the gateway 4 forms a policy entry as follows.

TABLE 4

| | Jitter adjustment policy of inter-area jitter adjuster at gateway 4 | | | | | | |
|---|---|---|---|---|---|---|---|
| Packet matching | Periodicity source | Period size | Area ID | pro-D | Ingress node | Egress node | Bearer technology |
| Source MAC = 00:89:34:DA:BC:01 Pri = 6 | NA | NA | 1 | 50 μs | Network edge node 1.1 | Gateway 4 | 3 (Ethernet) |

For the inter-area jitter adjuster at the gateway 5, the controller delivers an adjustment policy to perform jitter adjustment on a packet of Flow 3 sent from a network edge node 4.1 of the factory area 4 according to a preset delay parameter pro-D of 70 μs. It is assumed that a MAC address of the network edge node 4.1 is 00:89:34:DA:BE:04. The inter-area jitter adjuster at the gateway 5 forms a policy entry as follows.

TABLE 5

Jitter adjustment policy of inter-area jitter adjuster at gateway 5

| Packet matching | Periodicity source | Period size | Area ID | pro-D | Ingress node | Egress node | Bearer technology |
|---|---|---|---|---|---|---|---|
| Source MAC = 00:89:34:DA:BE:04 Pri = 7 | NA | NA | 1 | 70 μs | Network edge node 4.1 | Gateway 5 | 3 (Ethernet) |

The inter-area jitter adjuster at the gateway 6 does not perform adjustment for a converged flow, and therefore no jitter adjustment policy is delivered.

(4) In the factory backbone network, fully-linked pro-Tunnels are pre-established between the gateway 4, the gateway 5, the gateway 6, and the inter-area jitter adjuster 2. Four pro-Tunnels are pre-established for each link pair to form a pro-Tunnel table as follows.

In the embodiments of the present disclosure, the factory backbone network is the central area described in the above embodiments. The above table only describes the inter-area paths pre-established between LAN_D1 and LAN_D3 as well as LAN_D4. Inter-area paths pre-established between other areas are similar and will not be described herein again.

It is to be noted that the pre-established inter-area path may be a unicast path or a multicast path (in which case there are multiple destination areas). The path may be unidirectional (from the source area to the destination area) or bidirectional. The period size T in the above table is 10 μs.

(5) The controller determines, according to the service features, that the service flows Flow 1 and Flow 2 require a jitter of 25 μs and the service flow Flow 3 requires a jitter of

TABLE 6

Inter-area paths pre-established in factory backbone network

| pro-Tunnel serial number | Local area | Source area | Destination area | Path type | Path direction | Band width | Bearer technology | Expected delay | Expected jitter |
|---|---|---|---|---|---|---|---|---|---|
| 1 | MAN_D1 | LAN_D1 | LAN_D3 | 1 (unicast) | 2 (bidirectional) | 10G | 4 (periodicity mapping, period size T) | 1 ms | 20 μs |
| 2 | MAN_D1 | LAN_D1 | LAN_D3 | 1 (unicast) | 2 (two-way) | 20G | 5 (periodicity mapping, period size 2T) | 1 ms | 40 μs |
| 3 | MAN_D1 | LAN_D1 | LAN_D3 | 1 (unicast) | 2 (two-way) | 40G | 6 (periodicity mapping, period size 4T) | 1 ms | 80 μs |
| 4 | MAN_D1 | LAN_D1 | LAN_D3 | 1 (unicast) | 2 (bidirectional) | 5G | 7 (SPN/MTN fine-grained slot crossing) | 1 ms | 10 μs |
| 5 | MAN_D1 | LAN_D1 | LAN_D4 | 1 (unicast) | 2 (bidirectional) | 10G | 4 (periodicity mapping, period size T) | 2 ms | 20 μs |
| 6 | MAN_D1 | LAN_D1 | LAN_D4 | 1 (unicast) | 2 (bidirectional) | 20G | 5 (periodicity mapping, period size 2T) | 2 ms | 40 μs |
| 7 | MAN_D1 | LAN_D1 | LAN_D4 | 1 (unicast) | 2 (bidirectional) | 40G | 6 (periodicity mapping, period size 4T) | 2 ms | 80 μs |
| 8 | MAN_D1 | LAN_D1 | LAN_D4 | 1 (unicast) | 2 (two-way) | 10G | 7 (SPN/MTN fine-grained slot crossing) | 2 ms | 10 μs |

10 µs. The controller delivers, to the gateway 4, a pro-Tunnel configuration item for service mounting. Service matching is performed for Flow 1 and Flow 2 according to source and destination MAC addresses and priorities. The matching service flow goes out of the gateway 4 directly through a channel having a pro-Tunnel serial number of 1. Service matching is performed for Flow 3 according to source and destination MAC addresses and a priority. The matching service flow goes out of the gateway 5 directly through a channel having a pro-Tunnel serial number of 8. Similar configuration tables are as shown in Tables 7 and 8.

TABLE 7

| Mounting table of inter-area paths pre-established in edge nodes of factory backbone network (at gateway 4) | | |
| --- | --- | --- |
| Flow matching | via pro-Tunnel or not | Serial number of pro-Tunnel for mounting |
| Flow characteristics of Flow 1 | Yes | 1 |
| Flow characteristics of Flow 2 | Yes | 1 |

TABLE 8

| Mounting table of pre-established inter-area paths in edge nodes of factory backbone network (at gateway 5) | | |
| --- | --- | --- |
| Flow matching | via pro-Tunnel or not | Serial number of pro-Tunnel for mounting |
| Flow characteristics of Flow 3 | Yes | 8 |

The pro-Tunnel for mounting is selected mainly based on the bandwidth, delay, and jitter. For the mounting in Tables 7 and 8, both pro-Tunnel 1 and pro-Tunnel 4 meet the bandwidth, delay, and jitter requirements of Flow 1 and Flow 2, and pro-Tunnel 1 is randomly selected. For Flow 3, only pro-Tunnel 8 meets the jitter requirement, so pro-Tunnel 8 is selected.

On the forwarding plane of the network architecture, the following processes are performed.

(1) The edge node 1.1 and the edge node 4.1 perform matching for incoming packets, such as Flow 1, Flow 2, and Flow 3, according to the matching policy.

(2) The matching packet obtained according to the matching policy is re-encapsulated, and time related information, a MAC address of the node, etc., are added. Packets of a terminal 1 and a terminal 3 are re-encapsulated at the edge node 1.1 and a packet of a terminal 6 is re-encapsulated at the edge node 4.1 to add timestamp information. It is to be noted that the format here is only an example, and an Ethernet type value (0x89BB) and the number of bytes occupied by a timestamp T1 (4 bytes) may be changed.

(3) At the gateway 4 and the gateway 5, jitter adjustment is performed on the packet according to Tables 4 and 5. The steps are as follows (using the processing at the gateway 4 as an example).

(A) The timestamp T1 in the matching packet is extracted.

(B) A local time T2 is checked.

(C) According to Table 4, pro-D=50 µs.

(D) When T2<T1+50 µs, the packet is cached until T2>=T1+50 µs, at which moment the packet is sent. When T2>=T1+50 µs, the packet is sent directly.

(E) The header of the re-encapsulated packet may be removed or modified as required, which is not particularly limited in the embodiments of the present disclosure.

(4) At the gateway 4 and the gateway 5, packet egress interfaces are mounted to the corresponding inter-area channels pro-Tunnel 1 and pro-Tunnel 8 according to Tables 7 and 8, and the packets are correspondingly encapsulated.

(5) The subsequent forwarding process is executed according to a normal procedure.

Figure 11:
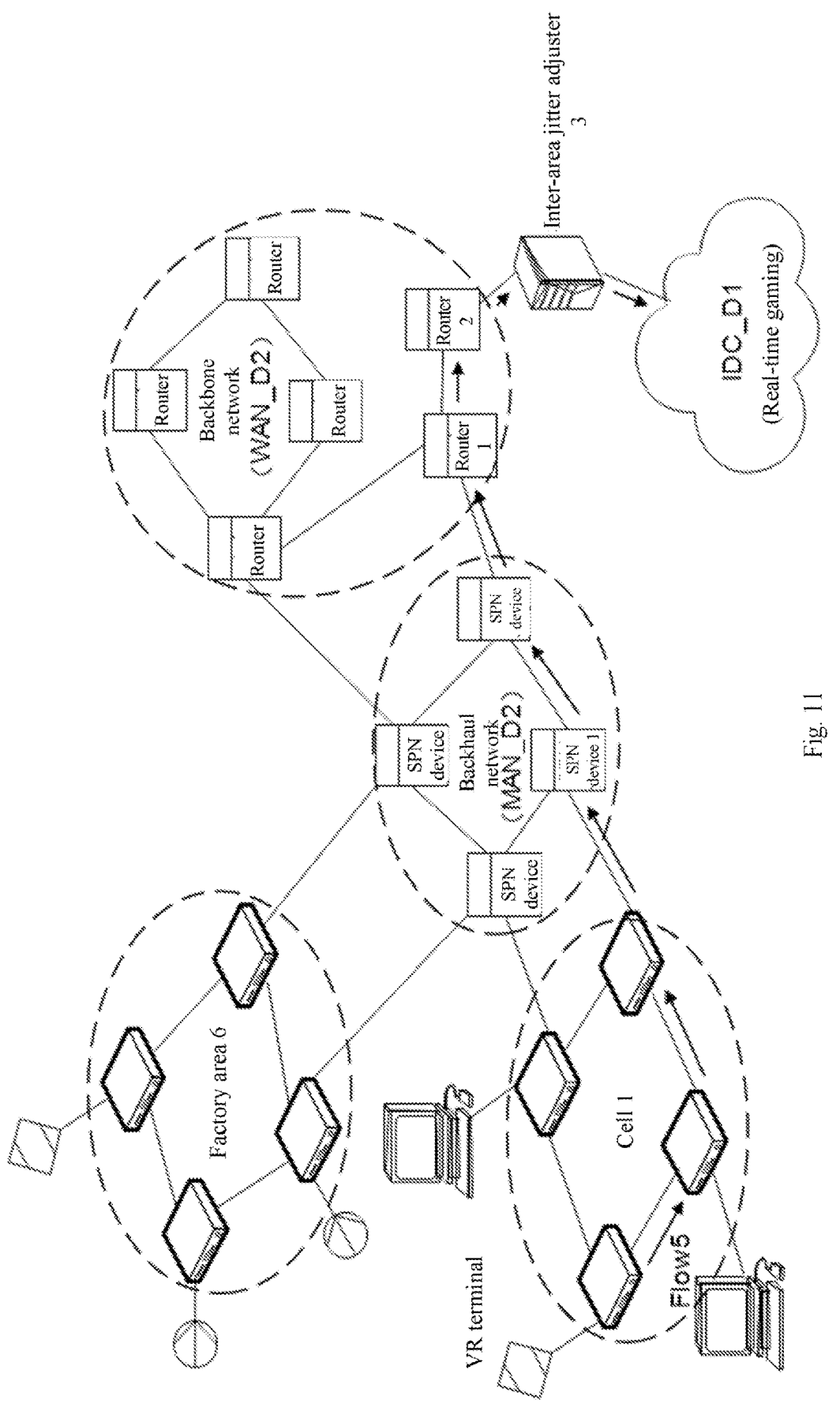
FIG. 11 is a schematic diagram of a network architecture of networking of real-time gaming according to an embodiment of the present disclosure.

Referring to FIG. 11, in Embodiment Three, the method is applied to networking of real-time gaming.

On the control plane of the network architecture, the following processes are performed.

(1) The controller divides the network into five network areas according to the network topology and service types, namely, a factory area 6 (LAN_D6), a user cell 1 (H-LAN_D1), a backhaul network (MAN_D2), a backbone network (WAN_D2), and a data center network (IDC_D1).

(2) The controller may enable a jitter adjustment function on several inter-area devices. Herein, only jitter adjustment of the backbone network is concerned, so only an inter-area jitter adjuster 3 at a router 2 is described.

(3) The controller delivers an adjustment policy to the inter-area jitter adjuster.

In the embodiments of the present disclosure, an inter-area jitter adjuster may be arranged in the router. For the inter-area jitter adjuster at the router 2, an adjustment policy is delivered to perform jitter adjustment on a packet of Flow 5 according to a preset delay parameter pro-D of 110 µs. It is to be noted that this 110 µs may be calculated within a jitter range of a basic delay calculated based on a periodicity mapping table. The steps are as follows:

(A) It is acquired that a periodic mapping mode with a period size of 2 T (T=10 µs) is used for underlying bearers.

(B) The controller learns that three hops are required from the router 1 to the router 2, and determines based on the mapping relationship that five periods are required.

(C) The basic delay is 5*2 T=100 µs.

(D) According to the law that the jitter is twice the period size, a jitter of 2*2 T is obtained.

(E) It can be learned according to the law of jitter fluctuation that a minimum delay Dmin is 100 µs−20 µs=80 µs and a maximum delay Dmax is 100 µs+20 µs=120 µs.

(F) pro-D may be set between 80 µs and 120 µs. In this example, pro-D is set to 110 µs, indicating that the delay is limited between 110 µs and 120 µs, and the jitter is compressed to 10 µs. It is to be noted that the earliest arriving packet needs to be cached for 30 µs in the worst case.

It is assumed that an IPv6 address of the router 1 is fcbb:bb01:0700::01. The inter-area jitter adjuster at the router 2 forms a policy entry as follows.

TABLE 9

Jitter adjustment policy of inter-area jitter adjuster at router 2

| Packet matching | Periodicity source | Period size | Area ID | pro-D | Ingress node | Egress node | Bearer technology |
|---|---|---|---|---|---|---|---|
| Source IPv6 = fcbb:bb01:0700::/48 | NA | NA | WAN_D2 | 110 µs | Router 1 | Router 2 | 5 (periodicity mapping - 2T) |

It is to be noted that the matching is based on a range, not an exact match.

(4) In the backhaul network MAN_D2, fully-linked pro-Tunnels are pre-established between SPN devices 1 and 2. Four pro-Tunnels are pre-established for each link pair to form a pro-Tunnel table as follows.

According to a jitter adjustment type and whether re-encapsulation is required, the controller delivers a service feature matching policy at the area border. In this example, the jitter adjustment in the backbone network (WAN_D2) is implemented using a preset delay parameter pro-D, and an SRv6 re-encapsulation format is used. Therefore, a matching

TABLE 10

Inter-area paths pre-established between SPN devices 1 and 2 in backhaul network MAN_D2

| pro-Tunnel serial number | Local area | Source area | Destination area | Path Category | Path direction | Band width | Bearer technology | Expected delay | Expected jitter |
|---|---|---|---|---|---|---|---|---|---|
| 1 | MAN_D2 | H-LAN_D1 | WAN_D2 | 1 (unicast) | 2 (bidirectional) | 5G | 4 (periodicity mapping, period size T) | 1 ms | 20 µs |
| 2 | MAN_D2 | H-LAN_D1 | WAN_D2 | 1 (unicast) | 2 (bidirectional) | 5G | 5 (periodicity mapping, period size 2T) | 1 ms | 40 µs |
| 3 | MAN_D2 | H-LAN_D1 | WAN_D2 | 1 (unicast) | 2 (bidirectional) | 10G | 6 (periodicity mapping, period size 4T) | 1 ms | 80 µs |
| 4 | MAN_D2 | H-LAN_D1 | WAN_D2 | 1 (unicast) | 2 (bidirectional) | 5G | 7 (SPN/MTN fine-grained slot crossing) | 1 ms | 10 µs |

It is to be noted that the pre-established inter-area path may be a unicast path or a multicast path (in which case there are multiple destination areas). The path may be unidirectional (from the source area to the destination area) or bidirectional. The period size T in the above table is 10 µs.

(6) The controller determines, according to the service feature, that the service flow Flow 5 requires a jitter of 25 µs and a bandwidth of 1 G, and should select a channel having a pro-Tunnel serial number of 1 according to the required jitter. However, the remaining bandwidth of the channel having the pro-Tunnel serial number of 1 is less than 1 G, so a channel having a pro-Tunnel serial number of 2 is selected. The jitter adjustment is performed in the backbone network (WAN_D2). The path is calculated based on such a multi-stage jitter control mechanism. As such at the SPN device 1 of the backhaul network (MAN_D2), a policy mounting entry is formed as follows.

TABLE 11

Mounting table of inter-area paths pre-established at SPN1 of backhaul network (MAN_D2)

| Flow matching | via pro-Tunnel or not | Serial number of pro-Tunnel for mounting |
|---|---|---|
| Flow characteristics of Flow 5 | Yes | 2 | policy and an encapsulation policy are delivered to the area border node router 1, and a policy mounting entry is formed as follows.

TABLE 12

Table of service matching and encapsulation at router 1 of backbone network (WAN_D2):

| Flow matching | Whether to perform jitter adjustment | Whether to perform re-encapsulation | Encapsulation mode |
|---|---|---|---|
| Flow characteristics of Flow 5 | Yes | Yes | SRv6 |

On the forwarding plane of the network architecture, the following processes are performed.

(1) No special processing is performed during forwarding in the user cell 1 (H-LAN_D1) and the data center network (IDC_D1). It is considered that the H-LAN_D1 network is small, and its delay and jitter are ignored; and IDC_D1 is not managed by operators, so its delay and jitter are not considered. For Flow 5, the edge nodes including the SPN device 1 in MAN_D2 and the router 1 in WAN_D2 perform matching for the incoming packet according to the matching policy.

(2) At the SPN device 1, a packet egress interface is mounted to the corresponding inter-area channel pro-Tunnel 2 according to Table 11, and the packet is correspondingly encapsulated.

Figure 12:
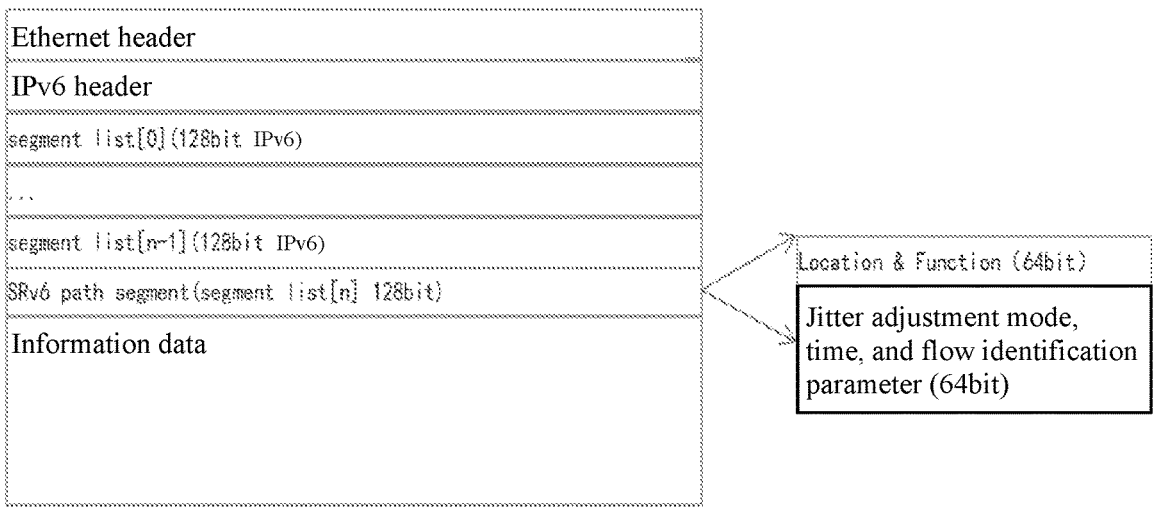
FIG. 12 is a schematic diagram of an SRv6-based re-encapsulation packet format according to an embodiment of the present disclosure.
Figure 13:
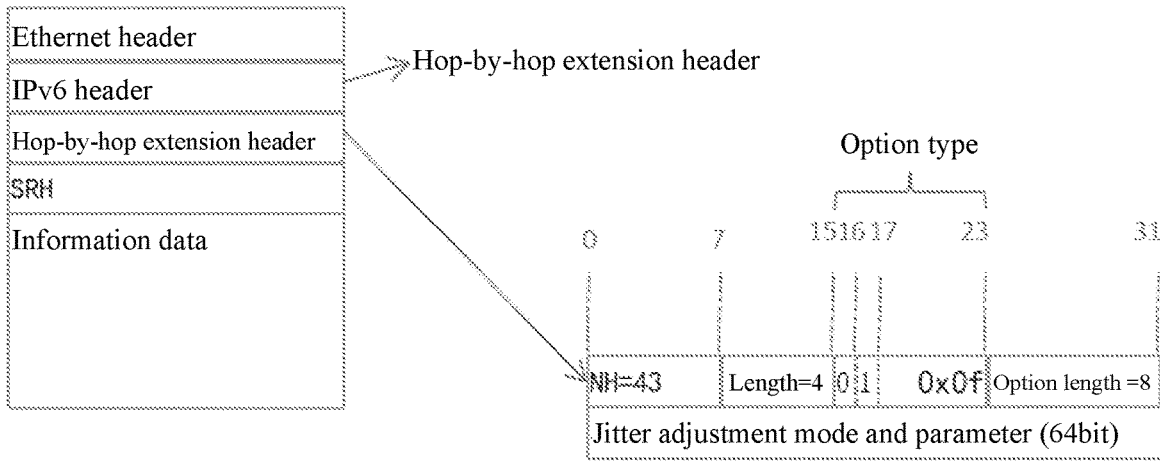
FIG. 13 is a schematic diagram of an IPv6-based re-encapsulation packet format according to an embodiment of the present disclosure.

(3) The router performs matching according to the matching policy of Table 12, re-encapsulates the matching packet, and adds time related information, an IPv6 address of the node, etc. FIG. 12 and FIG. 13 show two different encapsulation formats, where time, a flow identification, an adjustment mode, and other information are carried in a path segment field or an IPv6 extension header (hop-by-hop extension header). In FIG. 13, a next header is briefly referred to as NH. NH=43 indicates that it is a routing extension header. In addition, a type in the routing extension header indicates an SID list of SRv6, briefly referred to as SRH. When the hop-by-hop extension header is obtained, the NH of the IPv6 header is 0, indicating that the IPv6 header is immediately followed by the hop-by-hop extension header.

(4) At the router 2, jitter adjustment is performed on the packet according to Table 9. The steps are as follows.

(A) The timestamp T1 in the matching packet is extracted.

(B) A local time T2 is checked.

(C) According to Table 9, pro-D=110 $\mu$s.

(D) When T2<T1+110 $\mu$s, the packet is cached until T2>=T1+110 $\mu$s, at which moment the packet is sent. When T2>=T1+110 $\mu$s, the packet is sent directly.

(E) The header of the re-encapsulated packet may be removed or modified as required, which is not particularly limited in the embodiments of the present disclosure.

(5) The subsequent forwarding process is executed according to a normal procedure.

Figure 14:
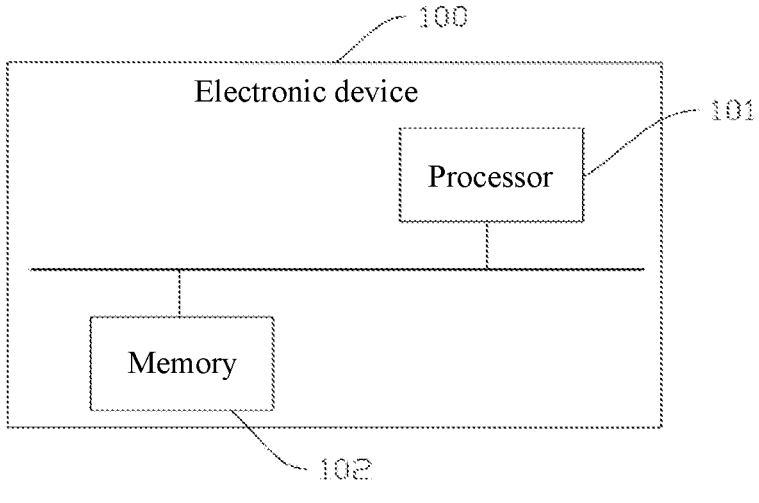
FIG. 14 is a schematic structural diagram of an electronic device according to an embodiment of the present disclosure.

FIG. 14 shows an electronic device 100 according to an embodiment of the present disclosure. The electronic device 100 includes a processor 101, a memory 102, and a computer program stored in the memory 102 and executable by the processor 101 which, when executed by the processor 101, causes the processor 101 to implement the network communication method.

The processor 101 and the memory 102 may be connected by a bus or in other ways.

The memory 102, as a non-transitory computer-readable storage medium, may be configured for storing a non-transitory software program and a non-transitory computer-executable program, for example, the network communication method described in the embodiments of the present disclosure. The processor 101 runs the non-transitory software program and the non-transitory computer-executable program stored in the memory 102, to implement the network communication method.

The memory 102 may include a program storage area and a data storage area. The program storage area may store an operating system, and an application required by at least one function. The storage data area may store data and the like required for executing the network communication method. In addition, the memory 102 may include a high-speed random access memory, and may also include a non-transitory memory, e.g., at least one magnetic disk storage device, flash memory device, or other non-transitory solid-state storage device. In some implementations, the memory 102 optionally includes memories 102 located remotely from the processor 101, and the remote memories 102 may be connected to the electronic device 100 via a network. Examples of the network include, but not limited to, the Internet, an intranet, a local area network, a mobile communication network, and combinations thereof.

The non-transitory software program and instructions required to implement the network communication method are stored in the memory 102 which, when executed by one or more processors 101, cause the one or more processors

101 to implement the network communication method, for example, implement the method steps S110 to S130 in FIG. 2, the method steps S210 to S220 in FIG. 3, the method steps S310 to S320 in FIG. 4, the method steps S410 to S420 in FIG. 5, the method steps S510 to S530 in FIG. 6, and the method steps S610 to S630 in FIG. 7.

The apparatus embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

It should also be understood that the various implementations provided by the embodiments of the present disclosure may be arbitrarily combined to achieve different technical effects.

Although some embodiments of the present disclosure have been described above, the present disclosure is not limited to the implementations described above. Those having ordinary skills in the art can make various equivalent modifications or replacements without departing from the essence of the present disclosure. Such equivalent modifications or replacements fall within the scope defined by the claims of the present disclosure.

What is claimed is:

1. A network communication method, applied to a control plane of a network architecture, the network communication method comprising:

acquiring a topology structure of the network architecture, determining a preset division policy matching the topology structure, and dividing the topology structure into a plurality of areas based on the preset division policy, wherein the areas comprises a first area and a second area;

enabling an inter-area jitter adjuster, wherein the inter-area jitter adjuster is arranged between two adjacent areas; and calculating an area border adjustment parameter according to an intra-area bearer capability of the first area, and sending the area border adjustment parameter to the inter-area jitter adjuster, wherein the inter-area jitter adjuster is arranged between the first area and the second area, and the inter-area jitter adjuster performs jitter adjustment on a service packet from a first network element in the first area, such that the service packet is sent to a second network element in the second area, comprising: the inter-area jitter adjuster compares a local time of the inter-area jitter adjuster with the time of sending the service packet and a period size or delay parameter of the service packet, to control whether to send the service packet to the second network element in the second area, in response to a preset condition being not satisfied, the service packet is cached, and the service packet is sent to the second network element in the second area in response to the preset condition being satisfied.

2. The network communication method of claim 1, wherein the division policy is obtained by:

acquiring a bearer technology and traffic information of the network elements in the network architecture; and obtaining the division policy according to the topology structure, the bearer technology, and the traffic information.

3. The network communication method of claim 1, wherein after sending the area border adjustment parameter to the inter-area jitter adjuster, such that the inter-area jitter adjuster performs jitter adjustment on the service packet from the first network element in the first area, the network communication method further comprises:

selecting, according to division of the areas, a central area from the areas and arranging an inter-area channel in the central area according to a plurality of communication characteristics, such that the service packet having been subjected to jitter adjustment is sent from the first network element of the first area to the second network element of the second area through the inter-area channel.

4. The network communication method of claim 1, wherein calculating the area border adjustment parameter according to the intra-area bearer capability of the first area comprises:

obtaining the intra-area bearer capability according to a hop count from the first network element in the first area to the inter-area jitter adjuster and a bearer technology of the first network element; and calculating the area border adjustment parameter according to the intra-area bearer capability.

5. An electronic device, comprising a memory and a processor, wherein the memory is configured for storing a computer program which, when executed by the processor, causes the processor to carry out the network communication method of claim 1.

6. A non-transitory computer-readable storage medium, storing a program which, when executed by a processor, causes the processor to carry out the network communication method of claim 1.

* * * * *